United States Patent
Nara

[19]

[11] Patent Number: 6,064,252
[45] Date of Patent: May 16, 2000

[54] CLOCK SUPPLY APPARATUS REDUCING CONSUMPTION OF POWER

[75] Inventor: Yoshikazu Nara, Yokohama, Japan

[73] Assignee: Matsushita Electric Industrial Co., Ltd., Osaka, Japan

[21] Appl. No.: 09/060,302

[22] Filed: Apr. 15, 1998

[30] Foreign Application Priority Data

Apr. 23, 1997 [JP] Japan ................................. 9-118661

[51] Int. Cl.[7] ....................................................... G05F 3/02
[52] U.S. Cl. .......................... 327/544; 713/323; 713/330; 307/126
[58] Field of Search ................................. 327/544, 291, 327/116, 119; 713/310, 321, 323, 330; 307/125, 126

[56] References Cited

U.S. PATENT DOCUMENTS

| | | | |
|---|---|---|---|
| 5,428,820 | 6/1995 | Okada et al. | 455/38.3 |
| 5,546,568 | 8/1996 | Bland et al. | 395/550 |
| 5,596,765 | 1/1997 | Baum et al. | 395/800 |
| 5,845,139 | 12/1998 | Fischer et al. | 395/750.06 |
| 5,848,281 | 12/1998 | Smalley et al. | 395/750.04 |

*Primary Examiner*—Kenneth B. Wells
*Attorney, Agent, or Firm*—Venable; Robert J. Frank; Allen Wood

[57] ABSTRACT

A clock supply apparatus includes a low-rate source clock generating unit for generating a low-rate source clock signal, a frequency multiplication/division unit for performing frequency multiplication/division processing for the low-rate source clock signal to generate a high-rate clock signal to be utilized in signal processing only during a period in which a sleep signal remains nonactive, a sleep time measuring unit for measuring a sleep time duration from the moment the sleep signal becomes active and issuing a sleep end signal upon measurement of a predetermined time period, and a sleep control unit for controlling whether the signal processing block is placed in a sleep or non-sleep mode. The sleep control unit decides the end of the sleep period upon detection of the sleep end signal.

2 Claims, 2 Drawing Sheets

CLOCK SUPPLY APPARATUS REDUCING CONSUMPTION OF POWER

BACKGROUND OF THE INVENTION

The present invention generally relates to a clock (or clock signal) supply apparatus destined for use in a system having a sleep operation mode and a non-sleep operation mode, and more particularly to a clock supply apparatus of which power consumption can be reduced during a sleep period (i.e., in the sleep operation mode).

For affording a better understanding of the present invention, a conventional clock supply apparatus known heretofore will briefly be reviewed. FIG. 2 is a block diagram showing, by way of example, a configuration of a system equipped with a conventional clock supply apparatus, the principle of which will be described below on the presumption that the circuits constituting the clock supply apparatus shown in FIG. 2 are implemented in the form of CMOS (complementary metal oxide semiconductor) digital circuits. Accordingly, when the clock supply to the circuits is interrupted, the power consumption must be zero in principle. On the other hand, the power consumption increases as the driving clock rate (frequency of the clock signal) becomes higher.

The system shown in FIG. 2 comprises a clock supply apparatus 211 and a signal processing block 206, wherein the clock supply apparatus 211 supplies a high-rate (high-frequency) clock signal 208 to be utilized for signal processing performed by the signal processing block 206 in the non-sleep mode, while the supply of the high-rate clock signal 208 to the signal processing block 206 is stopped in the sleep mode.

The clock supply apparatus includes a high-rate source clock generating unit 201 for generating a high-rate (high-frequency) source clock signal 207 and a frequency multiplication/division unit 202 in which the high-rate source clock signal 207 undergoes a frequency multiplication/division processing, which results in generation of a high-rate clock signal 208 suited for the signal processing. The high-rate clock signal 208 has a frequency which satisfies the processing rate required by the signal processing block 206. A clock interrupting unit 203 constituting a part of the clock supply apparatus is designed so as to supply the high-rate clock signal 208 to the signal processing block 206 only during a period in which a sleep signal 209 is nonactive.

The clock supply apparatus further includes a sleep time measuring unit 204 which starts a time measurement with the aid of the high-rate clock signal 208 from the moment when the sleep signal 209 becomes active. A sleep end signal 210 is generated after measurement of a predetermined time period. In other words, the period during which the sleep time measuring unit 204 is performing the time measurement represents the sleep period with the other period representing the non-sleep period.

A sleep control unit 205 constituting another part of a clock supply apparatus is in charge of controlling the sleep mode and the non-sleep mode of the signal processing block 206. More particularly, the sleep signal 209 is made active for validating the sleep mode of the signal processing block 206, whereby the supply of the high-rate clock signal 208 to the signal processing block 206 is stopped. Upon detection of the sleep end signal 210, the sleep control unit 205 decides the end of the sleep period to thereby make the sleep signal 209 nonactive. Thus, the supply of the high-rate clock signal 208 to the signal processing block 206 is reopened, which in turn results in restarting of the processing operation of the signal processing block 206.

As is apparent from the above discussion the signal processing block 206 can be set to the complete sleep mode due to the interruption of the supply of the clock in the sleep mode. However, the high-rate source clock generating unit 201, the frequency multiplication/division unit 202 and the sleep time measuring unit 204 of the clock supply apparatus continue to operate at a high clock rate even in the sleep mode in order to measure the sleep time period.

Thus, the conventional clock supply apparatus suffers from a problem in that a relatively high power consumption can not be avoided even during the sleep time period because the high-rate source clock generating unit, the frequency multiplication/division unit and the sleep time measuring unit continue to operate at a high clock rate even in the sleep mode. Consequently, when the clock supply apparatus is employed in an apparatus or system which is designed for continuous operation over an extended time by reducing the power consumption by adopting the sleep mode, as in the case of a portable apparatus or system designed to be driven with a cell, the intrinsic purpose of employing the clock supply apparatus can not be achieved, giving rise to a problem.

SUMMARY OF THE INVENTION

In light of the state of the art described above, it is an object of the present invention to provide a clock supply apparatus which is capable of solving satisfactorily the problem of the conventional clock supply apparatus as mentioned above.

In view of the above and other objects which will become apparent as the description proceeds, there is provided according to a general aspect of the present invention a clock supply apparatus which includes a low-rate source clock generating unit for generating a low-rate source clock signal, the low-rate source clock generating unit being provided with an automatic frequency control unit and a temperature drift compensating unit, a frequency multiplication/division unit for performing frequency multiplication/division for the low-rate source clock signal to thereby generate a high-rate clock signal for signal processing only during a period in which a sleep signal remains nonactive, the high-rate clock signal for the signal processing having a frequency higher than that of the low-rate source clock signal, a sleep time measuring unit for performing time measurement with the low-rate source clock signal from the moment when the sleep signal becomes active and issuing a sleep end signal upon measurement of a predetermined time period, and a sleep control unit for changing over the sleep signal between active state and nonactive state in dependence on sleep or non-sleep mode, the sleep control unit deciding end of the sleep period on the basis of the sleep end signal.

Further, according to another aspect of the present invention, there is provided a system having a sleep mode which includes a signal processing unit for which sleep/non-sleep control is performed by the clock supply apparatus as described above.

By virtue of the arrangement of the clock supply apparatus described above, the power consumption can be reduced significantly during the sleep mode because only the low-rate source clock generating unit operating at a low clock rate and the sleep period measuring unit are put into operation in the sleep mode of the system.

The above and other objects, features and attendant advantages of the present invention will more easily be understood by reading the following description of the preferred embodiments taken only by way of example in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments by reference to the drawings.

Figure 1:
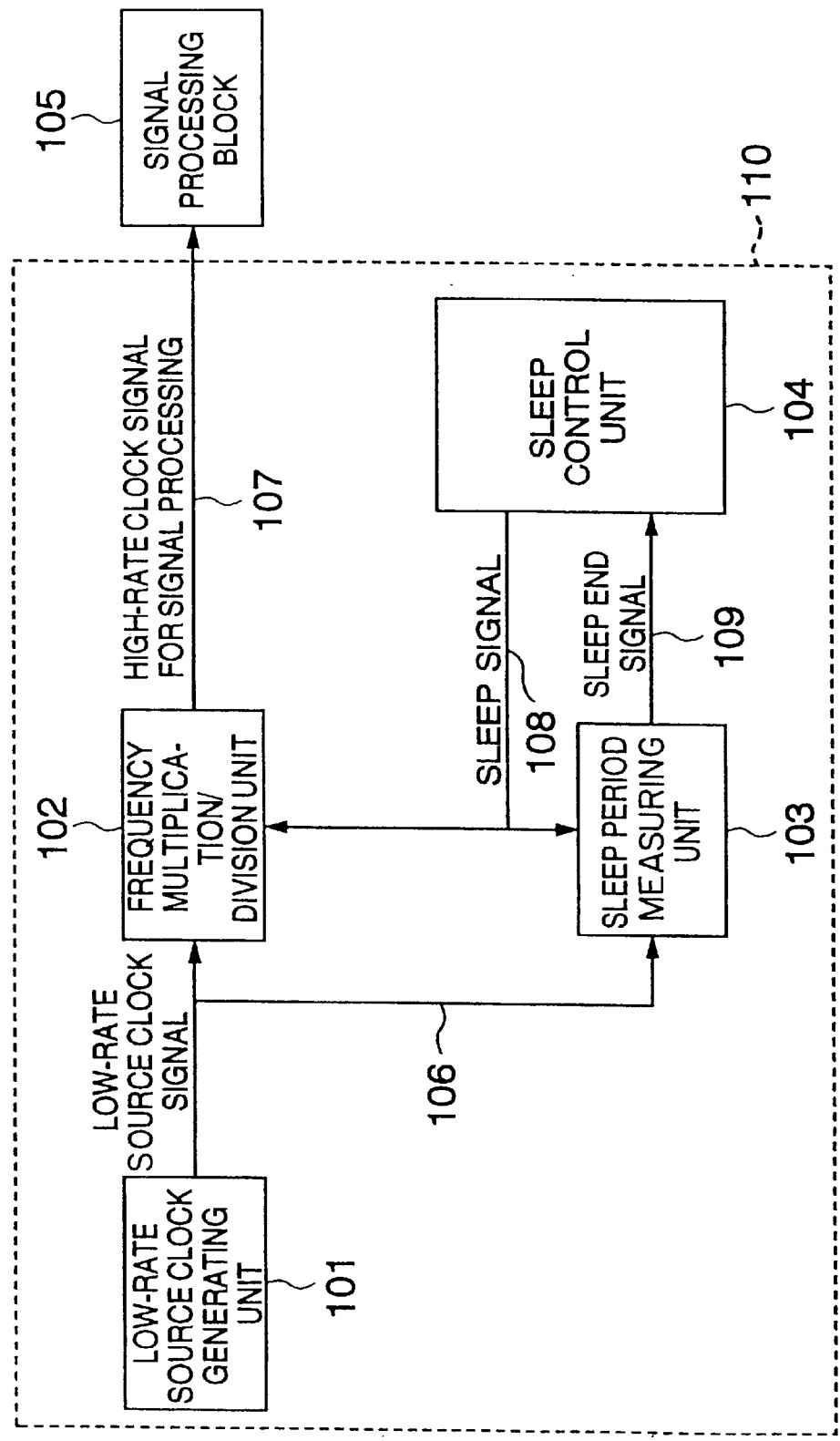
FIG. 1 is a block diagram showing a configuration of a system provided with a clock supply apparatus according to an embodiment of the present invention.
Figure 2:
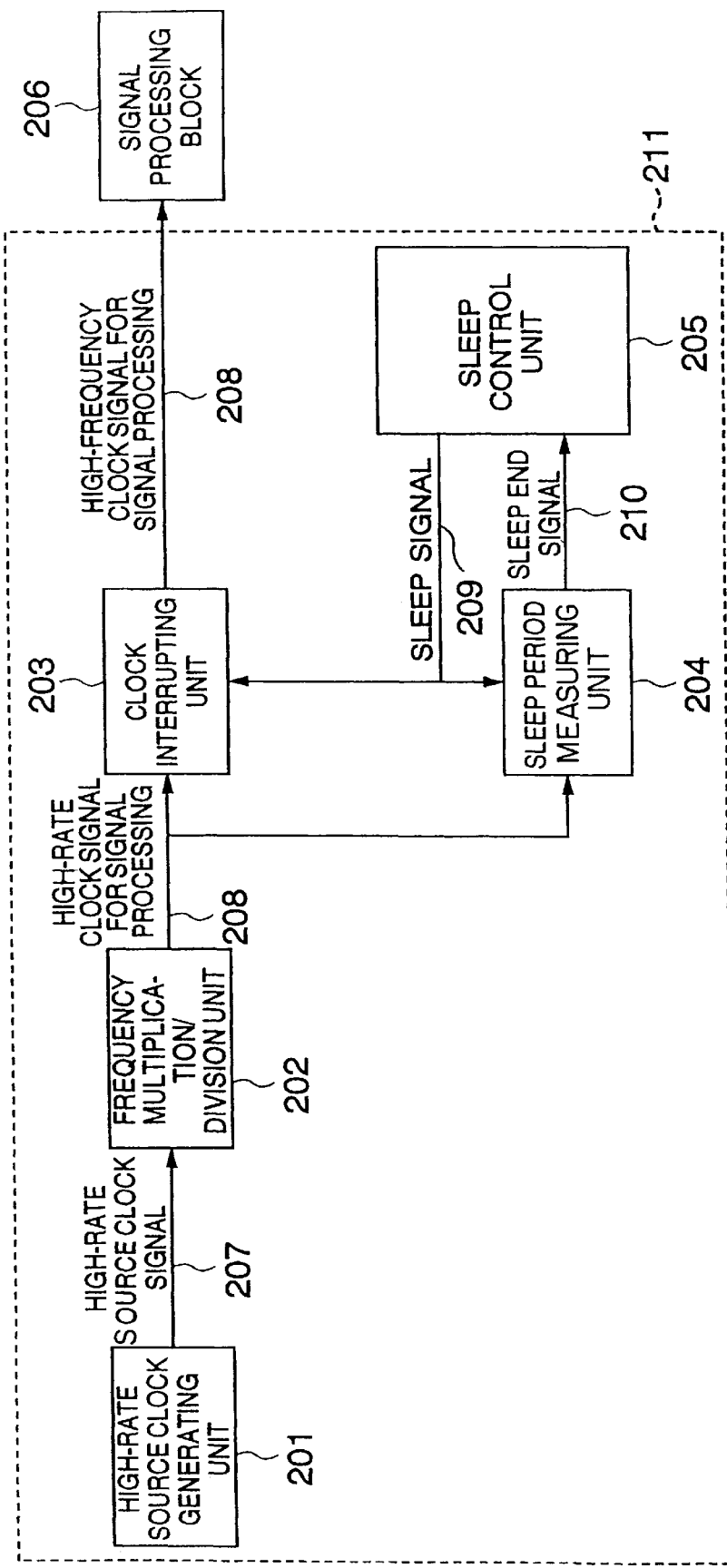
FIG. 2 is a block diagram showing, by way of example, a configuration of a system equipped with a conventional clock supply apparatus.

FIG. 1 is a block diagram showing a configuration of a system provided with a clock supply apparatus according to an embodiment of the present invention. In this conjunction, it is presumed that the circuits constituting the system shown in FIG. 1 are implemented in the form of CMOS-type digital circuits as in the case of the conventional system described hereinbefore by reference to FIG. 2. To say it in another way, in the system now under consideration, the power consumption must be zero in principle when the clock supply to the circuits is stopped. Further, the power consumption decreases as the rate or frequency of the driving clock becomes lower.

The system shown in FIG. 1 comprises a clock supply apparatus 110 and a signal processing block 105, wherein the clock supply apparatus 110 is designed for supplying a high-rate clock signal 107 (which may also be referred to as the high-frequency clock signal) to the signal processing system or block 105 to be utilized in the signal processing executed by the processor 105 in the non-sleep mode, while the supply of the high-rate clock signal 107 to the signal processing block 105 is stopped in the sleep mode.

The clock supply apparatus includes a low-rate source clock generating unit 101 for generating a low-rate source clock signal 106 (which may also be referred to as the low-frequency source clock signal). A frequency multiplication/division unit 102 is designed for outputting a high-rate clock signal 107 having a frequency suited for the signal processing performed by the signal processing block 105 through frequency multiplication/division processing of the low-rate source clock signal 106 so long as a sleep signal 108 remains non-active. On the other hand, when the sleep signal 108 is active, the frequency multiplication/division unit 102 stops operation completely to stop outputting the high-rate clock signal 107.

The signal processing block 105 is designed for executing a signal processing in conformance with the timing given by the high-rate clock signal 107 during the non-sleep period while stopping the operation completely when the supply of the high-rate clock signal 107 for the signal processing is stopped in the sleep mode.

The clock supply apparatus further includes a sleep time measuring unit 103 for starting a time measurement from the moment when the sleep signal 108 becomes active, to issue a sleep end signal 109 upon the lapse of a predetermined time period. In other words, the period during which the sleep time measuring unit 103 performs the time measurement represents the sleep period with the other period representing the non-sleep period.

A sleep control unit 104 constituting another part of the clock supply apparatus is in charge of controlling the sleep/non-sleep mode of the signal processing block 105. More specifically, when the signal processing block 105 is to be set to the sleep mode, the sleep signal 108 is made active to stop the supply of the high-rate clock signal 107 to the signal processing block 105. On the other hand, upon detection of the sleep end signal 109, the sleep control unit 104 recognizes or decides the end or termination of the sleep period to make the sleep signal 108 nonactive. At that time point, the supply of the high-rate clock signal 107 to the signal processing block 105 is started again, whereupon operation of the signal processing block 105 is restarted.

As will now be understood from the foregoing description, in the clock supply apparatus according to the present invention, the signal processing block 105 is set to the completely sleeping state because of interruption of the clock supply during the sleep period, as in the case of the conventional apparatus. By contrast, the low-rate source clock generating unit 101 and the sleep time measuring unit 103 of the clock supply apparatus are maintained in the operating state for measuring the sleep time duration. However, in the clock supply apparatus according to the present invention, the low-rate clock is employed as the source clock, and the high-rate clock for the signal processing is generated through frequency multiplication/division of the source clock. Owing to the feature that the frequency of the source clock is intrinsically low, power consumption by the low-rate source clock generating unit 101 for generating the low rate or frequency source clock signal as well as power consumption by the sleep time measuring unit 103 designed for performing the time measurement by using the low-rate clock signal can be made small. For this reason, the power consumption of the clock supply apparatus during the sleep period can be reduced.

As is apparent from the foregoing, with the clock supply apparatus according to the present invention, the power consumption can be reduced during the sleep period because only the low-rate source clock generating unit and the sleep period measuring unit are maintained in the operating state during the sleep period. Accordingly, when the clock supply apparatus according to the present invention is applied to a cell-driven portable apparatus/instrument or the like, the time period over which the latter can be operated continuously is extended or elongated, to a great advantage.

Many modifications and variations of the present invention are possible in the light of the techniques disclosed above. It is therefore to be understood that within the scope of the appended claims, the invention may be practiced otherwise than as specifically described.

What is claimed is:

1. A clock supply apparatus, comprising:
   low-rate source clock generating means for generating a low-rate source clock signal having a frequency lower than a predetermined value;
   frequency conversion means for performing at least one of frequency multiplication and frequency division of said low-rate source clock signal only during a period in which a sleep signal remains nonactive, to thereby generate a high-rate clock signal for signal processing, said high-rate clock signal having a frequency higher than said predetermined value;
   sleep time measuring means for performing time measurement with said low-rate source clock signal from the moment when said sleep signal becomes active and issuing a sleep end signal upon measurement of a predetermined time period; and sleep control means for changing over said sleep signal between an active state and a nonactive state to provide a sleep mode or a non-sleep mode, said sleep control means controlling the end of the sleep mode in response to said sleep end signal.

2. A system having a sleep mode, comprising:

a clock supply apparatus; and signal processing block means for which sleep/non-sleep control is performed by said clock supply apparatus, wherein said clock supply apparatus includes low-rate source clock generating means for generating a low-rate source clock signal having a frequency lower than a predetermined value, frequency conversion means for performing at least one of frequency multiplication and frequency division of said low-rate source clock signal only during a period in which a sleep signal remains nonactive, to thereby generate a high-rate clock signal for said signal processing block means, said high-rate clock signal having a frequency higher than said predetermined value, sleep time measuring means for performing time measurement with said low-rate source clock signal from the moment when said sleep signal becomes active and issuing a sleep end signal in response to expiration of a predetermined time period, and sleep control means for changing over said sleep signal between an active state and a nonactive state to provide a sleep mode or a non-sleep mode, said sleep control means controlling the end of the sleep mode upon generation of said sleep end signal.

* * * * *